July 9, 1968 W. C. CHRISTINE ET AL 3,391,847
DISPOSABLE BOWL
Filed July 7, 1966
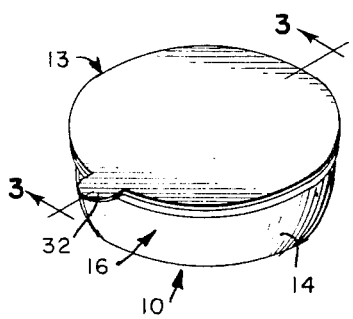
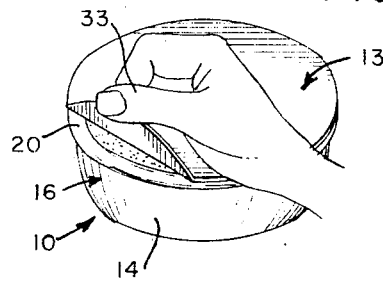
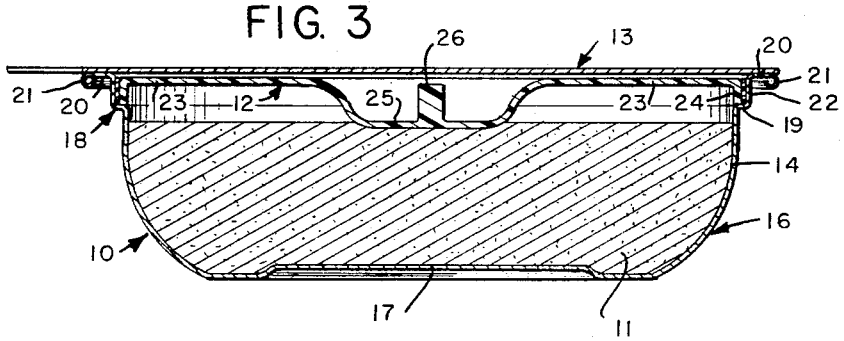
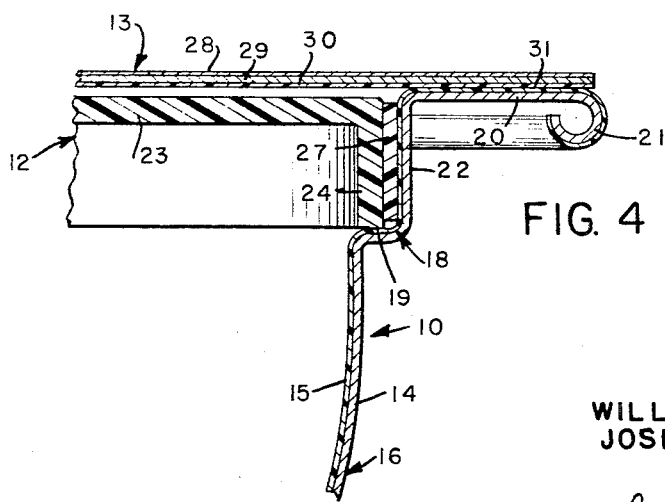
INVENTOR
WILLIAM C. CHRISTINE
JOSEPH E. PIERCE
BY *Sherman Levy*
ATTORNEY

United States Patent Office 3,391,847
Patented July 9, 1968

3,391,847
DISPOSABLE BOWL
William C. Christine, Catasauqua, and Joseph E. Pierce, Allentown, Pa., assignors, by mesne assignments, to A.E.I. Corporation, Bethlehem, Pa., a corporation of Delaware
Filed July 7, 1966, Ser. No. 563,409
5 Claims. (Cl. 229—43)

ABSTRACT OF THE DISCLOSURE

A disposable bowl or container for foodstuffs or food products wherein the material is adapted to be prepacked into the bowls and provided with a snap-in lid and wherein there is further provided a removable cover over the sealed lid and container.

---

This invention relates to a disposable bowl or container, and more particularly to a disposable bowl for products or material such as sugar, artificial sweeteners or the like.

An object of the present invention is to provide a disposable bowl for material such as foodstuffs or food products wherein the material such as sugar is adapted to be prepacked into foil bowls and wherein a snap-in lid of a suitable material such as a suitable plastic material is adapted to be inserted, and wherein a cover is adapted to be subsequently hermetically sealed over the lid and container, and wherein the cover prevents moisture from entering the package during storage, but wherein the cover can be easily removed as for example when access is to be gained to the material in the container.

Another object is to provide such a disposable bowl wherein there is provided a snap-in lid that permits easy accessibility to the sugar, sweetener or the like, and wherein the lid serves to prevent transmission of excessive moisture from the air to the product in the container during normal use, the foil bowl providing an attractive marketing and merchandising package as well as offering increased protection to the material therein.

Still another object is to provide a disposable bowl that is economical to manufacture and efficient in use and which is rugged in structure, and further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIGURE 1 is a perspective view illustrating one application of the present invention.

FIGURE 2 is a perspective view similar to FIGURE 1 but showing the step of manually removing the cover.

FIGURE 3 is an enlarged vertical sectional view taken on the line 3—3 of FIGURE 1.

FIGURE 4 is an enlarged fragmentary sectional view illustrating certain constructional details of the present invention.

Referring in detail to the drawings, the numeral 10 indicates the disposable bowl of the present invention which is adapted to have a quantity of material 11 therein, and wherein the material 11 may be sugar, artificial sweetener or the like. The numeral 12 indicates a snap-in lid or closure, while the numeral 13 indicates a cover for the unit. As shown in the drawings the disposable bowl 10 consists of a container 16 which includes a side portion 14 as well as a bottom portion 17, and the container 16 is adapted to be made of aluminum foil with a vinyl coating on the inner surface thereof.

The upper portion of the container 16 is adapted to be shaped or formed to include an annular recess or grooved portion 18 which defines or provides a shoulder 19 as well as an upstanding portion 22 that terminates in a horizontally disposed rim portion 20, and as shown in FIGURE 4, the outer edge of the rim 20 may terminate in a rolled edge or bead 21.

As shown in the drawings the lid 12 includes a main body portion 23 which has a depending circular or annular flange 24 at the outer periphery thereof, and the flange 24 is adapted to snugly seat in the recessed portion 18 as shown in the drawings. A reinforcing ring 27 may be arranged within the recessed portion 18. The lid 12 further includes an intermediate recessed portion 25 which is provided with an upstanding lug section 26 that is adapted to have its upper surface approximately flush with the surface of the main body portion 23, and the lug 26 is adapted to function as a convenient handgrip for facilitating the manual handling or removal and replacement of the lid 12 on the container 16.

As shown in the drawings the cover 13 is adapted to be made of laminated material and may consist of a layer of paper 28, foil 29, and vinyl 30. The numeral 31 indicates the point where the vinyl 30 may be sealed or fused to the vinyl 15 which is arranged above the rim 20, and it is to be understood that this seal, as indicated by the numeral 31, is adapted to initially extend in a circular fashion completely around the container. The numeral 32 indicates a tab on the cover 13 which is adapted to be conveniently gripped by the fingers 33 as for example when the cover 13 is to be removed.

From the foregoing, it will be seen that there has been provided a disposable bowl for material such as the material 11 and it is to be understood that any suitable type of material 11 can be used in or with the bowl so that while the present invention has been described and illustrated for use with sugar, artificial sweeteners or the like, it is to be understood that the present invention is not limited or restricted to such use.

When using the disposable bowl, it is to be understood that initially the container 16 is filled with the desired quantity of material such as sugar 11, and then the lid 12 is placed on the container 16 so that the annular flange 24 is snugly received in the recess 18, and then the cover 13 is positioned on the container 16 above the lid 12. As previously stated the cover 13 is adapted to be made of laminated material such as the paper 28, foil 29, and vinyl 30, and the vinyl 30 is adapted to be sealed to the vinyl 15 on the container 16 whereby a seal or joint 31 is provided which maintains the material 11 in a condition so that it is not readily affected by moisture or the like until the material is to be used.

The cover 13 is provided with a finger-engaging tab or portion 32 and initially the parts are in the position of FIGURE 1. When it is desired to gain access to the material 11, it is only necessary to manually grip the tab 32 by means of the fingers 33 as shown in FIGURE 2 whereby the cover 13 can be peeled off of the bowl so as to expose the lid 12. Then, when desired, the lid 12 can be readily raised or removed by manually gripping the lug 26 so that a person can readily gain access to the material 11. After the desired quantity of material 11 has been removed from the container 16, the lid 12 is adapted to be replaced thereon.

The parts can be made of any suitable material and in different shapes or sizes.

It is to be noted that the disposable bowl of the present invention includes the container 16 with the inner vinyl lining 15, the laminated vinyl cover 13, the sealable abutting portions 31, and the peelable cover 13 which can be manually removed, as well as the lid 12. The seal 31 is adapted to be of a type so that when sufficient or slight manual pressure is applied to the cover 13 by means of the tab 12, the seal 31 can be broken to permit the cover 13 to be peeled off whereby the lid 12 can be removed when desired. The lid 12 is adapted to be used for preventing dirt, moisture and the like from contaminating the material 11. It is to be noted that with this construction, there is a vinyl-to-vinyl bond at the point indicated by the numeral 31.

The present invention is especially suitable for use as a disposable bowl for sugar or artificial sweeteners and it is to be noted that there is provided a snap-in plastic lid or cover 12, as well as the cover 13 which is laminated of vinyl, foil and paper. The container 16 is adapted to be made of aluminum foil with a vinyl coating 15 on the inside thereof. With the parts arranged as shown in the drawings, sugar or other material is adapted to be prepacked into the foil container 16 and this sugar is indicated by the numeral 11. The snap-in lid 12 of molded plastic is then inserted, and the cover 13 is hermetically sealed over both the container and the lid, and the seal of vinyl to vinyl at the point 31 is peelable. The cover 13 prevents moisture from entering the package during storage but can be easily removed when desired. The snap-in lid 12 permits easy access to the sugar or sweetener or other material, and yet prevents rapid transmission of moisture in the air to the sugar or sweetener during normal use. Also the foil container or bowl 16 provides an attractive marketing and merchandising package and in addition offers superior and increased protection of the sugar, sweetener or other material as indicated by the numeral 11.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

What is claimed as new is as follows:

1. In a disposable bowl, a container having a coating on the inner surface thereof, there being an annular recess in the upper portion of said container, a snap-in lid having an annular depending flange seated in said recess, said container including a side wall portion, a bottom portion, and a horizontally disposed upper circular rim portion which terminates in a rolled beaded edge, a cover removably mounted over said container and lid, and said cover having a coating material on the lower surface thereof which is bonded and sealed to the coating of material on the container.

2. The structure as defined in claim 1 and further including a finger-engaging tab on said cover.

3. The structure as defined in claim 1 wherein said container is made of aluminum foil and has a vinyl coating on the inner surface thereof.

4. The structure as defined in claim 1 wherein said lid is made of plastic material and wherein said cover is of laminated paper, foil and vinyl construction.

5. The structure as defined in claim 1 wherein said bowl is adapted to have a quantity of sugar, artificial sweetener or the like therein, said container being made of aluminum foil and having a vinyl coating on the inner surface thereof, said lid being made of plastic, said cover having a laminated paper, foil and vinyl construction with the vinyl of the cover being bonded and sealed to the vinyl on the container.

References Cited
UNITED STATES PATENTS

| | | | |
|---|---|---|---|
| 2,156,574 | 5/1939 | Sidon | 229—43 X |
| 2,878,128 | 3/1959 | Jorgenson. | |
| 2,880,859 | 4/1959 | Tupper | 229—43 X |
| 2,913,140 | 11/1959 | Vuillemenot | 220—60 |
| 3,163,311 | 12/1964 | Stolk | 220—29 X |
| 3,214,074 | 10/1965 | Schechter | 229—48 X |
| 3,272,422 | 9/1966 | Miller | 229—43 |
| 3,344,974 | 10/1967 | Bostrom | 229—43 |

DONALD F. NORTON, *Primary Examiner.*